United States Patent [19]

Rochling et al.

[11] Patent Number: 4,803,671
[45] Date of Patent: Feb. 7, 1989

[54] SENSOR FOR ACOUSTIC SHOCKWAVE PULSES

[75] Inventors: Hans Rochling, Bamberg; Karl H. Schlee, Neunkirchen, both of Fed. Rep. of Germany

[73] Assignee: Siemens Aktiengesellschaft, Berlin and Munich, Fed. Rep. of Germany

[21] Appl. No.: 79,177

[22] Filed: Jul. 29, 1987

[30] Foreign Application Priority Data

Jul. 30, 1986 [DE] Fed. Rep. of Germany ....... 3625820

[51] Int. Cl.$^4$ ............................................ H01L 41/04
[52] U.S. Cl. ...................................... 367/166; 73/632; 367/167; 310/337; 310/800
[58] Field of Search ............... 367/157, 160, 163, 165, 367/166, 167, 172, 180; 128/24 A, 328; 73/632, 644, 717, DIG. 4, 754; 310/337, 800, 336

[56] References Cited

U.S. PATENT DOCUMENTS

| | | | |
|---|---|---|---|
| 2,545,101 | 3/1951 | Meunier | 367/166 |
| 4,178,577 | 12/1979 | Cini et al. | 367/166 |
| 4,433,400 | 2/1984 | DeReggi et al. | 367/163 |
| 4,474,184 | 10/1984 | Harui | 73/644 |
| 4,653,036 | 3/1987 | Harris et al. | 367/163 |
| 4,734,611 | 3/1988 | Granz | 310/800 |

FOREIGN PATENT DOCUMENTS

| | | |
|---|---|---|
| 0086531 | 8/1983 | European Pat. Off. . |
| 0179983 | 5/1986 | European Pat. Off. . |
| 3328051 | 2/1985 | Fed. Rep. of Germany . |
| 3437976 | 4/1986 | Fed. Rep. of Germany . |

OTHER PUBLICATIONS

Article by Von M.-Mueller from Acoustica, Sep. 1985, No. 4, Stuttgart, Deutschland.
DeReggi, A. S. et al., "Piezoelectric Polymer Probe for Ultrasonic Applications", J. Acoust. Soc. Am., 69(3), Mar. 1981.
Shotton, K. C. et al., "A PVDF Membrane Hydrophone for Operation in the Range of OSMHz to ISMHz", Ultrasonics (May 1980), vol. 18, No. 3.
Sullivan, T. D. et al., "Piezoelectric Polymer Flexural Disk Hydrophone", J. Acoust. Soc. Am., 63(5), May 1978.

Primary Examiner—Michael J. Tokar
Assistant Examiner—Lawrence G. Fess
Attorney, Agent, or Firm—Hill, Van Santen, Steadman & Simpson

[57] ABSTRACT

A sensor for acoustic shockwave pulses, such as in lithotripsy, includes a piezo-electric measuring membrane disposed between two coupling membranes. The intervening space between the coupling membranes is filled with a coupling medium for transmitting the acoustic shockwave pulses. The measuring membrane is in a defined condition largely independent of external influences so that flows in the coupling medium or different pressure exertions on the two coupling membranes do not influence the measured signal produced by the measuring membrane.

12 Claims, 1 Drawing Sheet

SENSOR FOR ACOUSTIC SHOCKWAVE PULSES

BACKGROUND OF THE INVENTION

1. Field of the Invention

The present invention is directed to a sensor for measuring acoustic shockwave pulses and using a piezo-electric measuring membrane.

2. Description of the Related Art

Acoustic shockwave pulse sensors are useful in lithotripsy, for example, in disintegating kidney stones through the use of shockwaves.

A shockwave sensor is disclosed in German Published Application No. 34 37 976. The shockwave sensor is used for measuring pressure amplitudes of a shockwave pulse in a propagation medium, such as in water. An important application for such sensor is to measure the pressure at the focus of focused shockwaves. The German published application, however, does not disclose how the sensor is to be constructed outside of the propagation medium, for example, in a lithotripsy application referred to as "dry coupling" with the patient. Likewise not discussed are difficulties which arise due to incorrect measured values identified by the piezo-electric measuring membrane as a result of secondary causes, such as, for example, circulation of the propagating medium (i.e. water) by pumps or due to the flow of and/or waves in the propagating medium which arise from the transmission of the shockwave.

In German Published Application No. 33 28 051 is disclosed the use of shockwave tubes in lithotripsy.

SUMMARY OF THE INVENTION

An object of the invention is to provide a sensor for acoustic shockwave pulses which provides defined measuring conditions independent of where the sensor is used. It is thus possible to accurately measure shockwave emitted by an independent pulse source with the present sensor. Under certain conditions, the sensor is also capable of being coupled directly to a source, or on the other hand, is capable of being introduced into a test basin or patient tank. In a particular example, the present sensor is suitable for dry coupling in conjunction with a lithotriptor.

These and other objects are achieved in a sensor including a piezo-electric measuring membrane disposed between two coupling membranes in which the intervening space between the coupling membranes is filled with a coupling medium for transmission of the acoustic shockwave pulses.

When, for example, the present invention is arranged within a propagating medium in the transmission path of a lithotriptor, then the disposition of the coupling membranes or webs on each side of the measuring membrane prevents flows or waves which propagate in the transmission path from exerting an influence on the measuring membrane. An advantage is thereby realized when the measuring membrane is situated in a closed capsule so that waves in the propagating medium which proceed in the direction of the membrane plane are kept away from the measuring membrane.

When, on the other hand, the present sensor is utilized in lithotripsy in combination with a shockwave generator by "dry coupling" i.e. without a patient tank, then the sensor is situated between a transmitting membrane of the shockwave generator and the skin of the patient, or a coupling disk connected to the skin of the patient when such disk is provided, so that the sensor identifies the measured values of the shockwave. In the case of the dry coupling, mutually different forces are exerted on the two coupling membranes. These different forces stress the piezo-electric measuring membrane and cause inaccurate measurements, and can even result in damage to the sensor. If the coupling medium in the sensor is in pressure equilibrium at both sides of the measuring membrane so that the same static pressures act on both sides of the measuring membrane, then the undesirable pre-stressing of the piezo-electric measuring membrane and the resulting imprecise measurements and even damage to the sensor are avoided. Pressure equilibrium is created in the present sensor by providing a conducting opening extending through a partition wall which separates the two coupling membranes. Since the measuring membrane is mounted on the partition wall, the pressure is equalized at both sides of the measuring membrane.

Further advantages and developments of the invention derive from providing a filling opening through which the coupling medium is supplied into the sensor. An electrical connection for transmitting electrical signals externally of the sensor are also preferrably provided connected to the piezo-electric membrane.

DESCRIPTION OF THE PREFERRED EMBODIMENTS

Figure 1:
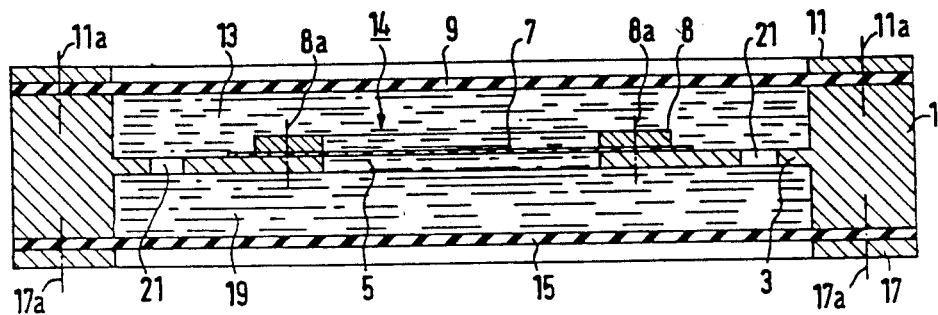
FIG. 1 is a cross section through a disk-shaped sensor of the present invention as used in lithotripsy.

FIG. 1 shows a disk-shaped sensor including a ring, or annular-shaped housing wall, 1 which includes a partition wall 3 extending radially inwardly at a middle of an inside edge of the ring 1. The partition wall 3 of the illustrated embodiment is parallel to the two opposite end faces of the ring 1. The partition wall 3 is provided with a central opening 5 over which extends a piezo-electric measuring membrane, or foil, 7. The central opening is circular in shape and has a diameter of approximately 40 mm so that the conducting area, or sensing area, of the measuring membrane for shockwave pulses also has a diameter of approximately 40 mm. The ring or housing wall 1 is composed, for example, of a plastic material, such as PVC (polyvinyl chloride). The measuring, or sensing, membrane 7 is preferrably of a web of PVDF (polyvinylidene fluoride). Although the preferred embodiment is circular with a like-shaped measuring membrane, other shapes can be used as well.

A clamp ring 8 holds the measuring membrane 7 in place over the central opening 5 so that the measuring membrane 7 extends across the central opening 5 without creases. The clamp ring 8, in one example, is of plastic material and is held by conventional plastic screws 8a extending through the clamp ring 8 and screwed into the partition wall 3. Other fastening means can also be used in place thereof.

A first coupling membrane, or web, 9 is clamped at a first upper end face of the ring 1 by a retaining ring 11, the retaining ring 11 being held by a fastening means 11a. The coupling membrane 9 is fabricated of rubber such as silicone or EPDM (ethylene-propylene-diene monomer) rubber hving a thickness of between 1 and 2 mm, inclusive, and a diameter of approximately 120 mm. The coupling membrane 9 is clamped between the end face of the ring 1 and the retaining ring 11 so that it extends across the extent of the inside diameter of the ring 1 in a slightly stretched condition and without creases.

A disk-shaped, first intervening space 13 extending from the inside edges of the ring 1 is defined between the first coupling membrane 9, on one side, and the partition wall 3 and measuring membrane 7, on the other side. The intervening space 13 is filled with a coupling medium 14 which transmits acoustic shockwaves. In one example, the coupling medium 14 is degasified distilled water. In another example, oils, such as castor oil, can also be used.

The configuration of first coupling membrane 9, the first retaining ring 11 and the first intervening space 13 are provided in mirror image at a lower side of the sensor, as well. In particular, a second coupling membrane 15 also made of rubber is fixed against a lower end face of the ring 1 one by a second retaining ring 17 held by fastening means 17a. Both the fastening means 11a and the fastening means 17a are plastic screws, although other fastening means can be used as well. A second intervening chamber, or space 19, is formed having similar dimensions as the upper space 13. The second intervening space 19 is also filled with the coupling medium 14. In one embodiment the intervening spaces 13 and 19 have diameters of, for example, approximately 100 mm. Thus, the coupling membranes 9 and 15 each have an effective surface of like diameter. In one embodiment, at least one of the coupling membranes 9 and 15 is formed of an optically transparent material to permit observation of the measuring membrane 7 from outside the sensor.

The first intervening space 13 is connected to the second intervening space 19 by one or more conducting openings extending through the partition wall 3. The conducting openings 21 enable the pressure to equalize between the first and second intervening spaces 13 and 19. It is thereby assured that the measuring membrane 7 is unstressed, and when the partition is midway between the coupling membranes, the measuring membrane 7 is likewise arranged roughly midway between the coupling membranes 9 and 15 since the same static pressure appears at both sides thereof.

The described sensor can be used as a whole in the transmission path of a shockwave generator of a lithotriptor without disturbing the measuring membrane despite flows and waves which occur in the transmission path. The sensor can also be placed between a coupling membrane of the lithotriptor generator (not shown) and a patient.

Figure 2:
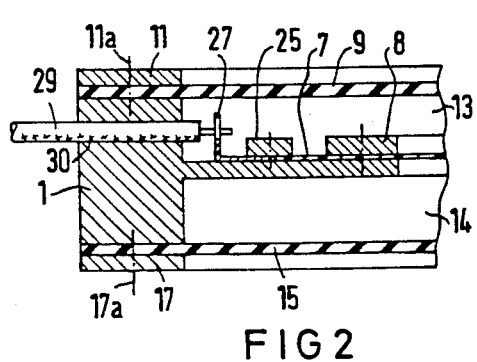
FIG. 2 is a partial cross section through the disk-shaped sensor of FIG. 1 showing an electrical connection to the measuring membrane.

FIG. 2 shows one possible procedure for electrically contacting the measuring membrane 7. The measuring membrane 7 extends beyond an outer edge of the clamp ring 8 and is electrically connected by a clamp connection 25 which, for example, is formed by a pressure plate resiliently held in place by a screw, A solder lug 27 is fastened to the clamp 25. A bipolar instrument lead 29 shown in FIG. 2 as a coaxial conductor, is soldered to the solder lug 27 and is conducted through a radial opening 30 in the ring 1. Care must be taken to ensure the existence of a water-tight seal between the ring 1 and the bipolar instrument line 29. It is of course understood that an additional electrical connection to the measuring membrane 7 is to be made as well.

Figure 3:
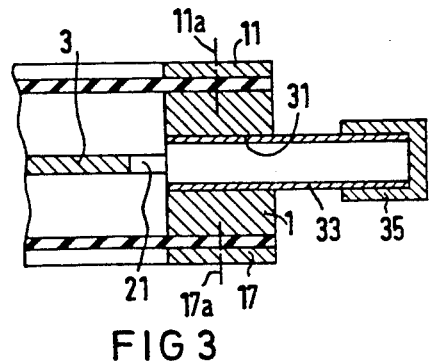
FIG. 3 is a partial cross section of the sensor of FIG. 1 including a filling or introduction for admitting a coupling medium.

Referring now to FIG. 3, identical components are provided with the same reference characters as in FIG. 1 and 2. Approximately in the center of the ring 1, an introduction opening 31 is provided with a short pipe or conduit 33 which is connected to the ring 1 in watertight fashion. The pipe for conduit 33 is connectable to a hose (not shown) through which the coupling agent or medium 14 is supplied into the sensor. After filling the intervening spaces or chambers 13 and 19 with the coupling medium 14, the hose is removed and a cover cap 35 is placed over the conduit 33. The cover cap 35 closes the introduction opening 31 so that the coupling medium 14 is not mixed with substances outside the sensor.

Although other modifications and changes may be suggested by those skilled in the art, it is the intention of the inventors to embody within the patent warranted hereon all changes and modifications as reasonably and properly come within the scope of their contribution to the art.

We claim:

1. A sensor for acoustic shockwave pulses, comprising:
    a pair of spaced coupling membranes defining an intervening space;
    a piezo-electric measuring membrane arranged between
    said pair of coupling membranes;
    a coupling medium filling said intervening space for transmitting acoustic shockwave pulses;
    a housing ring having end faces and a partition with a central opening;
    retaining rings being having faces generally the same shape as said end faces of
    said housing ring and clamping said coupling membranes to said end faces of said housing ring; and
    said measuring membrane being mounted covering said central opening in said partition.

2. A sensor as claimed in claim 1, wherein said measuring membrane is disposed midway between said pair of coupling membranes.

3. A sensor as claimed in claim 1, wherein at least one of said pair of coupling membranes is a rubber sheet.

4. A sensor as claimed in claim 1, wherein said measuring membrane has a sensor conducting area having a width of approximately 40 mm.

5. A sensor as claimed in claim 1, wherein said ring defines an introduction opening through which said coupling medium is supplied.

6. A sensor as claimed in claim 8, further comprising means for closing said introduction opening.

7. A sensor as claimed in claim 1, further comprising: a clamp connection electrically contacting said measuring membrane.

8. A sensor as claimed in claim 7, further comprising: an instrument line electrically connected to said clamp connection.

9. A sensor as claimed in claim 1, wherein said coupling membranes each have an effective width of about 100 mm.

10. A sensor as claimed in claim 1, wherein said partition defines at least one conducting opening through which said coupling medium can flow.

11. A sensor for measuring acoustic shockwaves, comprising:
    an annular support wall;

a first coupling membrane fastened at a first end face of said support wall;

a second coupling membrane fastened at a second end face of said support wall, said second end face being opposite said first end face defining an intervening space therewith;

a coupling medium in said intervening space;

a partition wall extending inward from said annular support wall in said intervention space and defining a substantially central opening;

a measuring membrane fastened to said partition wall over said substantially central opening between said first and second coupling membranes within said annular support wall, said measuring membrane being a piezo-electric web; and means for electrically connecting said piezo-electric measuring membrane from outside said support wall.

12. A sensor as claimed in claim 11, wherein said partition wall includes at least one additional opening extending through said partition wall through which said coupling medium may flow.

* * * * *